US009708556B2

(12) United States Patent
Hyde et al.

(10) Patent No.: US 9,708,556 B2
(45) Date of Patent: Jul. 18, 2017

(54) SYSTEMS, METHODS, AND APPARATUSES RELATED TO THE USE OF GAS CLATHRATES

(71) Applicant: Elwha LLC, Bellevue, WA (US)

(72) Inventors: Roderick A Hyde, Redmond, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 644 days.

(21) Appl. No.: 13/862,211

(22) Filed: Apr. 12, 2013

(65) Prior Publication Data

US 2014/0305407 A1    Oct. 16, 2014

(51) Int. Cl.
| | |
|---|---|
| C10L 3/06 | (2006.01) |
| F17C 11/00 | (2006.01) |
| F02B 45/00 | (2006.01) |
| C10L 3/10 | (2006.01) |
| F02G 1/043 | (2006.01) |

(52) U.S. Cl.
CPC ............. *C10L 3/06* (2013.01); *F02B 45/00* (2013.01); *F17C 11/007* (2013.01); *C10L 3/108* (2013.01); *F02G 1/043* (2013.01); *Y02T 10/34* (2013.01)

(58) Field of Classification Search
CPC .......... B01J 7/00; B63B 35/4413; C01B 3/34; C10L 3/06; F17C 11/007; F02B 45/00
See application file for complete search history.

(56) References Cited

U.S. PATENT DOCUMENTS

| | | | | |
|---|---|---|---|---|
| 5,540,190 A | * | 7/1996 | Rogers | F02B 43/00 123/1 A |
| 5,613,362 A | * | 3/1997 | Dixon | F01K 25/065 60/641.7 |
| 5,806,316 A | | 9/1998 | Avakov et al. | |
| 7,553,996 B2 | | 6/2009 | Conant | |
| 8,603,422 B2 | * | 12/2013 | Maruyama | B01D 53/92 423/212 |
| 2003/0230250 A1 | * | 12/2003 | Chang Lin | F01P 3/02 123/41.54 |
| 2005/0256212 A1 | * | 11/2005 | Norbeck | C01B 3/34 518/702 |
| 2006/0042162 A1 | * | 3/2006 | Goldstein | C01B 3/065 48/61 |
| 2008/0125955 A1 | | 5/2008 | Boyer et al. | |
| 2008/0221373 A1 | | 9/2008 | Conant | |

(Continued)

FOREIGN PATENT DOCUMENTS

WO    WO 01/48367 A1    7/2001

OTHER PUBLICATIONS

PCT International Search Report; International App. No. PCT/US2014/033758; Aug. 27, 2014; pp. 1-2.

(Continued)

*Primary Examiner* — Sizo Vilakazi

(57) ABSTRACT

This disclosure relates generally to the use of gas clathrates. More particularly, this disclosure relates to systems, methods, and apparatuses related to the use of gas clathrates as a fuel source for automobiles. The gas clathrates may first be dissociated into at least one gas and the at least one gas delivered to the prime mover of a vehicle or the gas clathrates may be directly utilized by the prime mover as a fuel source.

43 Claims, 8 Drawing Sheets

(56) References Cited

U.S. PATENT DOCUMENTS

| | | | |
|---|---|---|---|
| 2009/0035627 A1* | 2/2009 | Tohidi | C01B 3/001 429/425 |
| 2013/0298761 A1* | 11/2013 | Hamad | F01N 3/04 95/11 |
| 2015/0114009 A1* | 4/2015 | Gates | F17C 1/00 62/50.1 |

OTHER PUBLICATIONS

PCT International Search Report; International App. No. PCT/US2014/033761; Aug. 27, 2014; pp. 1-2.

* cited by examiner

SYSTEMS, METHODS, AND APPARATUSES RELATED TO THE USE OF GAS CLATHRATES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/862,211, entitled SYSTEMS, METHODS, AND APPARATUSES RELATED TO THE USE OF GAS CLATHRATES, naming Roderick A. Hyde and Lowell L. Wood, Jr. as inventors, filed 12 Apr. 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates generally to the use of gas clathrates. More particularly, this disclosure relates to systems, methods, and apparatuses related to the use of gas clathrates as a fuel source for automobiles.

SUMMARY

This disclosure provides methods of providing gaseous fuel to a prime mover of a vehicle. The methods comprise providing a vehicle fuel storage system comprising a first vessel configured to receive, store, and discharge gas clathrates. The methods further comprise providing a separation system comprising a second vessel operably connected to the vehicle fuel storage system. The separation system is configured to dissociate the gas clathrates into at least one gas and a host material. The methods further comprise discharging the gas clathrates from the first vessel to the second vessel and dissociating at least a portion of the gas clathrates into the at least one gas and the host material. The methods may further comprise delivering the at least one gas to the prime mover.

This disclosure also provides vehicle fuel systems configured to utilize gas clathrates. The vehicle fuel systems comprise a vehicle fuel storage system and a separation system. The vehicle fuel storage system comprises a first vessel configured to receive, store, and discharge gas clathrates. The separation system comprises a second vessel operably connected to the vehicle fuel storage system. The separation system is configured to dissociate the gas clathrates into at least one gas and a host material.

This disclosure also provides vehicles comprising one of the above vehicle fuel systems and a prime mover configured to utilize dissociated gas to generate power. The prime mover may comprise an internal combustion engine, an external combustion engine, or a fuel cell.

This disclosure also provides methods of powering a vehicle. The methods comprise providing a vehicle fuel storage system comprising a first vessel configured to receive, store, and discharge gas clathrates. The methods further comprise discharging a portion of the gas clathrates from the first vessel and then generating heat from combusting the discharged gas clathrates. The methods further comprise converting the generated heat into mechanical work and utilizing the mechanical work to power the drive train of a vehicle. The combustion may be conducted in an engine configured to convert the generated heat from combustion into the mechanical work.

This disclosure also provides engines configured to directly utilize gas clathrates as a fuel source. This disclosure also provides vehicles comprising such engines.

DETAILED DESCRIPTION

Figure 1:
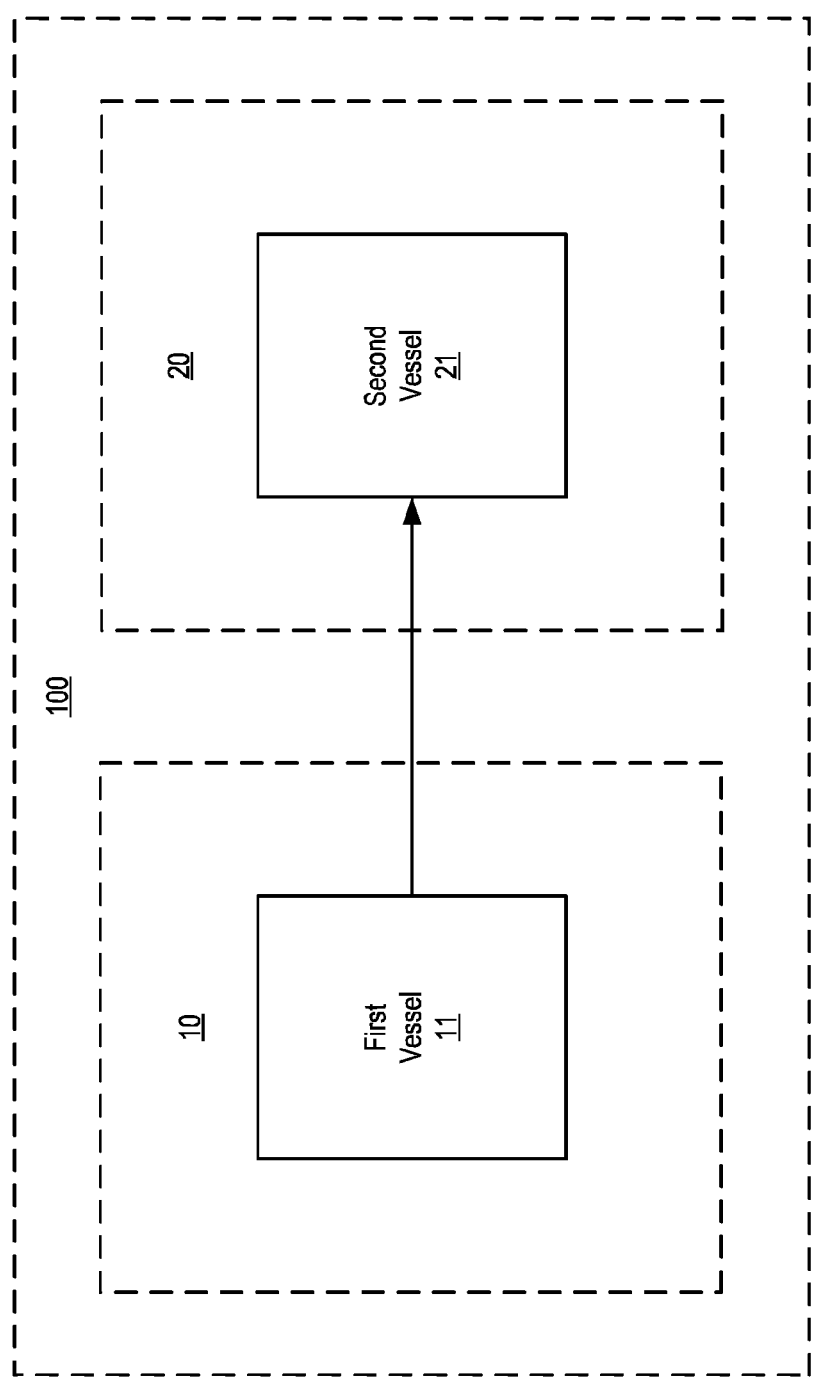
FIG. 1 illustrates an embodiment of a vehicle fuel system configured to utilize gas clathrates.

Natural gas is a cleaner-burning fuel compared to traditional fossil fuels. However, natural gas at ambient temperatures and atmospheric pressure is a low-volume gas. For an automobile to store a sufficient amount of natural gas for operation comparable to that of a gasoline or diesel engine, it has been necessary to increase the density of the natural gas. One approach has been to liquify the natural gas by cooling the natural gas to about −162 degrees Centigrade. At that temperature, natural gas is a liquid at essentially ambient pressure. Storage of liquid natural gas ("LNG") requires the use of special cryogenic equipment. Another approach has been to compress the natural gas to a pressure of about 200 to 248 bars. At that pressure and ambient temperature, natural gas occupies about 1/100th the volume of natural gas at general ambient temperatures and pressures. Storage of compressed natural gas ("CNG") requires the use of high-pressure storage vessels.

Gas clathrates are chemical substances in which certain gas molecules are trapped in a cage or crystal lattice formed by certain host materials. In many cases, the gas molecules stabilize the crystal lattice or cage, such that the crystal lattice or cage may maintain its structure at much higher temperature and lower pressure than would be possible without the presence of the gas molecules. Methane clathrates, for example, exist in nature, among other places, under sediments on the ocean floors. Gas clathrates may be able to store gases, such as methane, at volumes comparable to CNG, but at much lower pressures and at much higher temperatures than LNG.

Combustion of gas clathrates refers to dissociation of gas(es) from the clathrate host material and then combustion of the gas(es). During the process of combustion of the gas(es) the host material may also be vaporized. This vaporization does not constitute combustion. However, in some embodiments, the host material may include elements that may be combustible under certain conditions. Dissociation of gas(es) from the clathrate host material includes any process for separating the gas(es) from the clathrate host material. This includes diffusion of the gas(es) away from the solid clathrate host material and/or melting of the clathrate host material to release the gas(es).

The phrases "operably connected to," "connected to," and "coupled to" refer to any form of interaction between two or more entities, including mechanical, electrical, magnetic, electromagnetic, fluid, and thermal interaction. Likewise, "fluidically connected to" refers to any form of fluidic interaction between two or more entities. Two entities may interact with each other even though they are not in direct contact with each other. For example, two entities may interact with each other through an intermediate entity.

The term "substantially" is used herein to mean almost and including 100%, including at least about 80%, at least about 90%, at least about 91%, at least about 92%, at least about 93%, at least about 94%, at least about 95%, at least about 96%, at least about 97%, at least about 98%, and at least about 99%.

This disclosure provides methods of providing gaseous fuel to a prime mover of a vehicle. The methods comprise providing a vehicle fuel storage system comprising a first vessel configured to receive, store, and discharge gas clathrates. The methods further comprise providing a separation system comprising a second vessel operably connected to the vehicle fuel storage system. The separation system is configured to dissociate the gas clathrates into at least one gas and a host material. The methods further comprise discharging the gas clathrates from the first vessel to the second vessel and dissociating at least a portion of the gas clathrates into the at least one gas and the host material.

The methods may further comprise delivering the at least one gas to the prime mover. The prime mover may be an internal combustion engine, an external combustion engine, or a fuel cell. The first vessel may be configured to discharge the gas clathrates as a slurry to the second vessel.

The gas clathrates may comprise natural gas clathrates, methane clathrates, ethane clathrates, propane clathrates, and hydrogen clathrates. Accordingly, the at least one gas may comprise natural gas, methane, ethane, propane, or hydrogen.

The host material may comprise water. The host material may further comprise clathrate stabilizers. Examples of clathrate stabilizer include, but are not limited to carboxylic acids and/or carboxylate containing compounds, such as lactic acid, acetic acid, the lactate ion, or the acetate ion; sodium hydroxide and/or a sodium ion; calcium hydroxide and/or a calcium ion; tetrahydrofuran; a surfactant, such as an anionic surfactant, such as alkyl sulfates or alkyl aryl sulfonates; an aphron; water soluble salts; clay; oxide particles, such as magnesium oxide particles, organic compounds, such as phenyl, phenol, alkoxyphenyl, or imidazole containing compounds.

This disclosure also provides vehicle fuel systems configured to utilize gas clathrates. FIG. 1 illustrates a vehicle fuel system 100 comprising a vehicle fuel storage system 10 and a separation system 20. The vehicle fuel storage system 10 comprises a first vessel 11 configured to receive, store, and discharge gas clathrates. The separation system 20 comprises a second vessel 21 operably connected to the vehicle fuel storage system 10. The separation system 20 is configured to dissociate the gas clathrates into at least one gas and a host material.

First vessel 11 may be configured to maintain gas clathrates as a slurry during storage or as a solid during storage. The solid gas clathrates may be one cohesive solid or may be solid pellets and/or chunks. First vessel 11 may be configured to maintain an internal temperature of about 0 degrees Centigrade to about 25 degrees Centigrade. First vessel 11 may be configured to maintain an internal temperature of about 0 degrees Centigrade to about 20 degrees Centigrade. First vessel 11 may be configured to maintain an internal temperature of about 0 degrees Centigrade to about 15 degrees Centigrade. First vessel 11 may be configured to maintain an internal temperature of about 0 degrees Centigrade to about 10 degrees Centigrade, including from about 4 degrees Centigrade to about 10 degrees Centigrade.

First vessel 11 may be configured to be integrally secured to the frame of a vehicle. First vessel 11 may be configured to be directly or indirectly detachably secured to the frame of a vehicle, such as via a mechanical and/or magnetic device. First vessel 11 may be configured to be detachably connected to the fuel supply lines that feed the prime mover of a vehicle.

Second vessel 21 may be configured to operate at ambient temperature and/or at any temperature that is higher than the operating temperature of the first vessel 11. Alternatively, second vessel 21 may be configured to operate at a temperature that is about the same as an operating temperature of the first vessel, but at a lower pressure than that of first vessel 11. For example, second vessel 21 may be configured to maintain an internal temperature of about 0 degrees Centigrade to about 25 degrees Centigrade. Second vessel 21 may be configured to maintain an internal temperature of about 0 degrees Centigrade to about 20 degrees Centigrade. Second vessel 21 may be configured to maintain an internal temperature of about 0 degrees Centigrade to about 15 degrees Centigrade. Second vessel 21 may be configured to maintain an internal temperature of about 0 degrees Centigrade to about 10 degrees Centigrade, including from about 4 degrees Centigrade to about 10 degrees Centigrade.

First vessel 11 and second vessel 21 may each further comprise insulation. The insulation may comprise at least one material configured to and compatible with maintaining desired temperatures within each vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the first vessel 11 and/or the insulation may be attached to at least a portion of a surface of the first vessel 11, including an outer and/or inner surface. The insulation may be attached to at least a portion of a surface of the second vessel 21, including an outer and/or inner surface.

First vessel 11 and second vessel 21 may each be comprised of structural materials configured to and compatible with maintaining desired temperatures and pressures within each respective vessel. The structural material may comprise aluminum, brass, copper, ferretic steel, carbon steel, stainless steel, polytetrafluoroethylene (PTFE), polychlorotrifluoroethylene (PCTFE), vinylidene polyfluoride (PVDF), polyamide (PA), polypropylene (PP), nitrile rubber (NBR), chloroprene (CR), chlorofluorocarbons (FKM), and/or composite materials, including composite materials comprising carbon fibers, glass fibers, and/or aramid fibers.

First vessel 11 may be designed to maintain an internal pressure of about 1 bar to about 30 bar. First vessel 11 may be designed to maintain an internal pressure of about 10 bar to about 30 bar. First vessel 11 may be designed to maintain an internal pressure of about 10 bar to about 15 bar. First vessel 11 may be designed to maintain an internal pressure of about 15 bar to about 27 bar. First vessel 11 may be designed to maintain an internal pressure of about 20 bar to about 27 bar. First vessel 11 may be designed to leak or vent before burst.

First vessel 11 may be configured to receive gas clathrates as a solid and/or as a slurry. Alternatively, first vessel 11 may be configured to receive at least one gas and the host material and form the gas clathrates within the first vessel 11.

Separation system 20 may be configured to maintain a lower pressure in the second vessel 21 than the pressure maintained in the first vessel 11.

Additionally or alternatively, separation system 20 may be configured to maintain a pressure in the second vessel 21 sufficient to dissociate at least some of the gas clathrates into at least one gas and host material, but still maintain a pressure greater than the pressure required for delivering the at least one gas as fuel to a prime mover utilizing the vehicle fuel system 100.

Separation system 20 may be configured to maintain an internal pressure in the second vessel of about ambient pressure to about 30 bar. Separation system 20 may be configured to maintain an internal pressure in the second vessel of about 5 bar to about 20 bar. Separation system 20 may be configured to maintain an internal pressure in the second vessel of about 10 bar to about 15 bar. Separation system 20 may be configured to maintain an internal pressure in the second vessel of about ambient pressure to about 10 bar. Separation system 20 may be configured to maintain an internal pressure in the second vessel of about ambient pressure. Second vessel 21 may be designed to leak or vent before burst.

Figure 2:
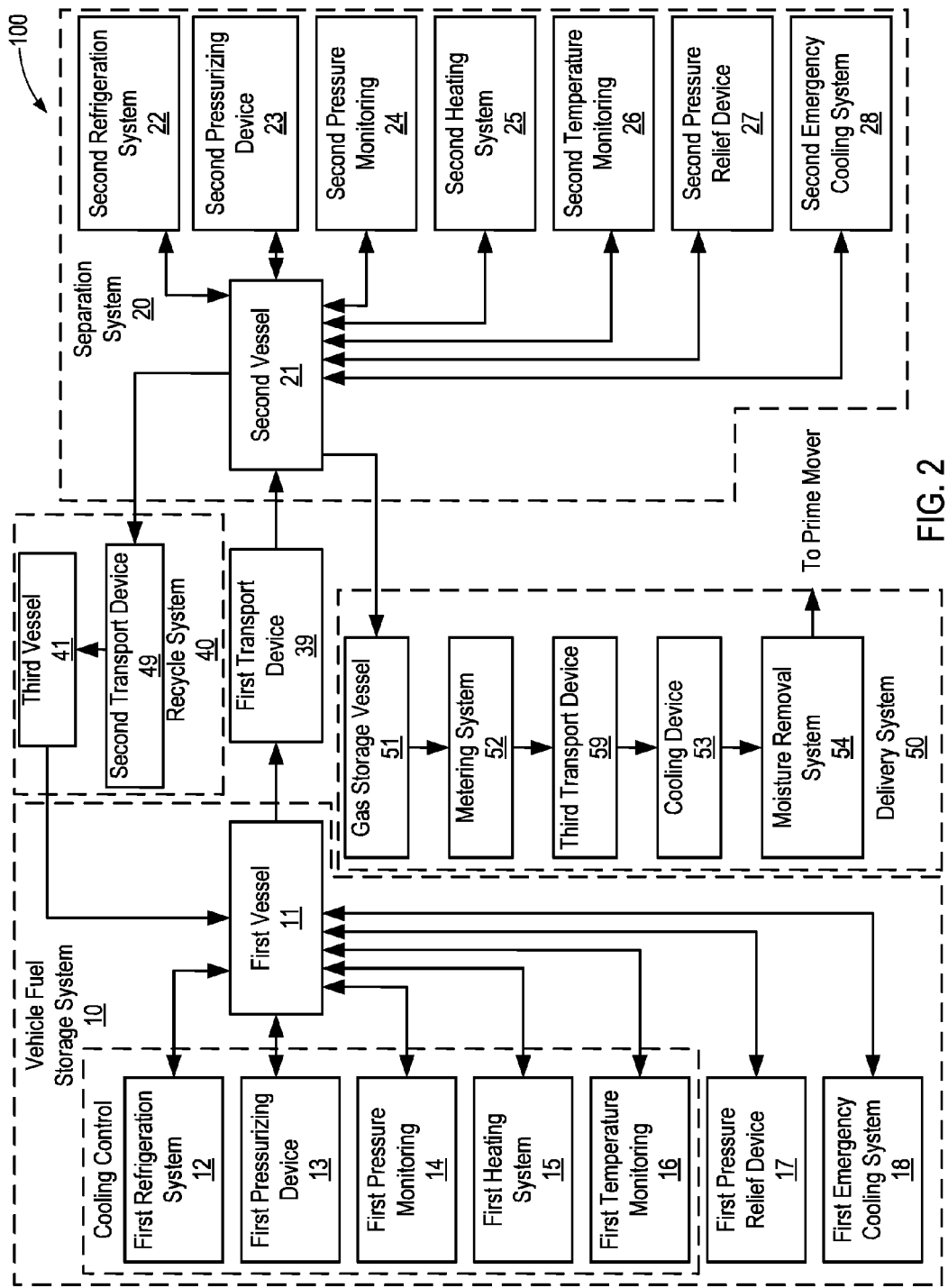
FIG. 2 illustrates the embodiment of FIG. 1 with additional optional components and systems.

FIG. 2 illustrates optional additional components and systems of vehicle fuel system 100.

Vehicle fuel storage system 10 may further comprise a first refrigeration system 12 in communication with first vessel 11. First refrigeration system 12 may be configured to maintain an internal temperature of the first vessel 11 within a desired set range.

First refrigeration system 12 may releasably surround at least a portion of the outer surface of the first vessel 11. Alternatively, the first refrigeration system 12 may be attached to at least a portion of a surface of the first vessel 11, including an outer and/or an inner surface.

First refrigeration system 12 may comprise a heat pipe. First refrigeration system 12 may comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. First refrigeration system 12 may comprise a vapor absorption system. The vapor absorption system may utilize water, ammonia, and/or lithium bromide. First refrigeration system 12 may comprise a gas cycle refrigeration system, such as one that utilizes air. First refrigeration system 12 may comprise a stirling cycle refrigeration system. The stirling cycle refrigeration system may utilize helium. The stirling cycle refrigeration system may comprise a free piston stirling cooler. First refrigeration system 12 may comprise a thermoelectric refrigeration system.

Vehicle fuel storage system 10 may further comprise a first pressurizing device 13 operably connected to the first vessel 11 and configured to maintain pressure within the first vessel 11. First pressurizing device 13 may comprise a moveable press integrated with the first vessel 11, wherein the moveable press is configured to maintain pressure within the first vessel 11. Examples of a moveable press include, but are not limited to, a hydraulic press. First pressurizing device 13 may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle fuel storage system 10 may further comprise a first pressure monitoring device 14 operably connected to the first vessel 11 and configured to monitor the internal pressure of the first vessel 11. First pressure monitoring device 14 may comprises a piezoresistive strain gauge, a capacitive sensor, an electromagnetic sensor, a piezoelectric sensor, an optical sensor, a potentiometric sensor, a thermal conductivity sensor, and/or an ionization sensor.

Vehicle fuel storage system 10 may further comprise a first heating system 15 configured and located to impart heat energy to the first vessel 11. First heating system 15 may be configured to transfer heat energy from the coolant used to cool the prime mover of the vehicle. Likewise, first heating system 15 may be configured to transfer heat energy from heat generated by the prime mover of the vehicle in any fashion, such as from an exhaust stream generated by the prime mover of the vehicle. Alternatively or in addition thereto, first heating system 15 may utilize solar energy, ambient temperatures, electric resistance heating elements and/or dielectric heating to impart heat energy to the first vessel 11.

First heating system 15 may be located external to the first vessel 11. First heating system 15 may be located internally within the first vessel 11. First heating system 15 may be integrated into a portion of a surface of the first vessel 11, including external or internal surfaces. First heating system 15 may be attached to at least a portion of a surface of the first vessel 11, such as the outer surface.

Vehicle fuel storage system 10 may further comprise a first temperature monitoring system 16 configured to monitor the internal temperature of the first vessel 11. First temperature monitoring system 16 may comprise a thermostat, a thermistor, a thermocouple, and/or a resistive temperature detector.

Vehicle fuel storage system 10 may further comprise a first pressure relief device 17 operably connected to the first vessel 11 and configured to reduce pressure within the first vessel 11. Examples of a first pressure relief device 17 include, but are not limited to, a pressure relief valve and a rupture disc.

Vehicle fuel storage system 10 may further comprise a first emergency cooling system 18 configured to rapidly cool the first vessel 11.

Vehicle fuel storage system 10 may further comprise a cooling control system configured to receive inputs from first pressure monitoring device 14 and/or first temperature monitoring system 16. The cooling control system may be configured to control first pressurizing device 13 and/or first heating system 15, such that it regulates at least one of pressure and temperature in order to maintain the gas clathrates within first vessel 11 in a clathrate stability range.

Separation system 20 may further comprise a second refrigeration system 22 in communication with second vessel 21. Second refrigeration system 22 may be configured to maintain an internal temperature of the second vessel 21 within a desired set range.

Second refrigeration system 22 may be attached to at least a portion of a surface of the second vessel 21, including an outer and/or an inner surface.

Second refrigeration system 22 may comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. Second refrigeration system 22 may comprise a vapor absorption system. The vapor absorption system may utilize water, ammonia, and/or lithium bromide. Second refrigeration system 22 may comprise a gas cycle refrigeration system, such as one that utilizes air. Second refrigeration system 22 may comprise a stirling cycle refrigeration system. The stirling cycle refrigeration system may utilize helium. The stirling cycle refrigeration system may comprise a free piston stirling cooler. Second refrigeration system 22 may comprise a thermoelectric refrigeration system.

Separation system 20 may further comprise second pressurizing device 23 operably connected to the second vessel 21 and configured to maintain pressure within the second vessel 21. Second pressurizing device 23 may comprise a moveable press integrated with the second vessel 21, wherein the moveable press is configured to maintain pressure within the second vessel 21. Examples of a moveable press include, but are not limited to, a hydraulic press. Second pressurizing device 23 may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Separation system 20 may further comprise a second pressure monitoring device 24 operably connected to the second vessel 21 and configured to monitor the internal pressure of the second vessel 21. Second pressure monitoring device 24 may comprises a piezoresistive strain gauge, a capacitive sensor, an electromagnetic sensor, a piezoelectric sensor, an optical sensor, a potentiometric sensor, a thermal conductivity sensor, and/or an ionization sensor.

Separation system 20 may further comprise a second heating system 25 configured and located to impart heat energy to the second vessel 21. Second heating system 25 may be configured to transfer heat energy from the coolant used to cool the prime mover of the vehicle. Likewise, second heating system 25 may be configured to transfer heat energy from heat generated by the prime mover of the vehicle in any fashion, such as from an exhaust stream generated by the prime mover of the vehicle. Alternatively or in addition thereto, second heating system 25 may utilize solar energy, ambient temperatures, electric resistance heating elements and/or dielectric heating to impart heat energy to the second vessel 21.

Second heating system 25 may be located external to the second vessel 21. Second heating system 25 may be located internally within the second vessel 21. Second heating system 25 may be integrated into a portion of a surface of the second vessel 21, including external or internal surfaces. Second heating system 25 may be attached to at least a portion of a surface of the second vessel 21, such as the outer surface.

Separation system 20 may further comprise a heat pipe, either as part of second refrigeration system 22 and/or second heating system 25 or separate therefrom. The heat pipe may be configured and located to control the temperature of the second vessel 21.

Separation system 20 may further comprise a second temperature monitoring system 26 configured to monitor the internal temperature of the second vessel 21. Second temperature monitoring system 26 may comprise a thermostat, a thermistor, a thermocouple, and/or a resistive temperature detector.

Separation system 20 may further comprise a second pressure relief device 27 operably connected to the second vessel 21 and configured to reduce pressure within the second vessel 21. Examples of a second pressure relief device 27 include, but are not limited to, a pressure relief valve and a rupture disc.

Separation system 20 may further comprise a second emergency cooling system 28 configured to rapidly cool the second vessel 21.

Separation system 20 may further comprise a pressure reducing valve operably connected to the first vessel 11 and the second vessel 21, wherein the pressure reducing valve is configured to reduce the pressure of gas clathrates discharged from the first vessel 11 to the desired pressure of the second vessel 21.

Separation system 20 may be configured to receive a continuous supply of gas clathrates while a vehicle utilizing vehicle fuel system 100 is operating. Alternatively, separation system 20 may be configured to periodically receive a batch of gas clathrates while a vehicle utilizing vehicle fuel system 100 is operating. Furthermore, separation system 20 may be configured to receive a variable supply of gas clathrates based on fuel requirements of the prime mover of the vehicle utilizing the vehicle fuel system 100.

Separation system 20 may be configured to control the rate of dissociation of the gas clathrates based on fuel requirements of the prime mover of the vehicle utilizing the vehicle fuel system 100, such as by regulating at least one of the temperature and the pressure of the gas clathrates within the second vessel 21.

Second vessel 21 may comprises a chamber configured to dissociate the gas clathrates into at least one gas and host material. Alternatively or in addition thereto, second vessel 21 may comprises a conduit configured to continuously dissociate the gas clathrates into at least one gas and host material.

Second vessel 21 may comprise a host material outlet configured for removing the host material from the second vessel 21. The host material outlet may be configured to periodically or continuously drain the host material from the second vessel 21 and remove the host material from the vehicle fuel system 100. The host material outlet may be configured to release the host material to an environment outside of a vehicle utilizing vehicle fuel system 100.

Vehicle fuel system 100 may further comprise a first transport device 39 operably connected to the vehicle fuel storage system 10 and operably connected to the separation system 20. The first transport device 39 may be configured to transfer gas clathrates from the vehicle fuel storage system 10 to the separation system 20. First transport device 39 may be configured to transport the gas clathrates as a slurry and/or as a solid, such as solid chunks or pellets.

First transport device 39 may be at least partially located internally within the first vessel 11. Likewise, the first transport device 39 may be at least partially external to the first vessel 11. Accordingly, first transport device 39 may be at least partially integrated into a portion of a surface, including an internal or external surface, of the first vessel 11. Additionally, the first transport device 39 may be at least partially integrated into a portion of a surface, including an internal or external surface, of the second vessel 21. Likewise, first transport device 39 may be at least partially internal and/or external to the second vessel 21.

First transport device 39 may be configured for moving solid gas clathrate. First transport device 39 may be configured for moving gas clathrate slurry. First transport device 39 may be configured to be hydraulically, mechanically, and/or electrically actuated.

First transport device 39 may comprise an auger, a grinder, an extruder, and/or a first pump. When first transport device 39 comprises a first pump, the inlet of the first pump may be operably connected to the vehicle fuel storage system 10 and an outlet of the first pump may be operably connected to the separation system 20. Examples of the first pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The first pump may be any pump compatible with pumping a gas clathrate slurry.

First transport device 39 may comprise a gravity feed device for use in embodiments where a portion of the first vessel 11 is higher than a portion of the second vessel 21. The gravity feed device may comprise a port, a tube, a pipe, a channel, a valve, a check valve, or similar feed conduits. First transport device 39 may comprise a conduit (such as a port a tube, a pipe, a valve, a check valve, or a channel) in embodiments where the pressure in first vessel 11 is higher than the pressure in second vessel 21. First transport device 39 may comprise a moveable surface. The moveable surface may comprise a conveyor belt configured to receive a coating of the gas clathrates from the vehicle fuel storage system 10 and configured to at least partially discharge at least one gas within the second vessel 21. For example, the moveable surface may comprise a rotating drum configured to receive a coating of the gas clathrates within first vessel 11 and at least partially discharge at least one gas within the second vessel 11. In another example, the moveable surface may comprise a string configured with beads of gas clathrates that may be conveyed from the first vessel 11 to the second vessel 21. In another example, the moveable surface may comprise a rotating disk configured to receive a coating of the gas clathrates within first vessel 11 and at least partially discharge at least one gas within the second vessel 11.

Vehicle fuel system 100 may further comprise a recycle system 40 configured to return host material from separation system 20 to vehicle fuel storage system 10. Accordingly, vehicle fuel storage system 10 may be configured to utilize at least a portion of the returned host material to fluidize the gas clathrates stored in the first vessel 11. The recycle system 40 may comprises a third vessel 41 configured to store host material removed from second vessel 21.

The recycle system 40 may further comprise a second transport device 49 configured to transport host material from the second vessel 21 to the third vessel 41. Alternatively, second transport device 49 may be configured to transport host material from the second vessel 21 directly to the first vessel 11. Second transport device 49 may be configured to transport the host material as a slurry or as a liquid.

The second transport device 49 may be located internally within the second vessel 21, may be integrated into a portion of a surface, including an internal or external surface, of the second vessel 21, or may be external to the second vessel 21. Second transport device 49 may be configured to be hydraulically, mechanically, and/or electrically actuated.

Second transport device 49 may comprise a gravity feed device for use in embodiments where a portion of the second vessel 21 is higher than a portion of the first vessel 11. The gravity feed device may comprise a port, a pipe, a channel, a valve, a check valve, or similar feed conduits. The second transport device 49 may comprise an auger, grinder, and/or second pump. When second transport device 49 comprises a second pump, the inlet of the second pump may be operably connected to the separation system 20 and an outlet of the second pump may be operably connected to vehicle fuel storage system 10. Examples of the second pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The second pump may be any pump compatible with pumping liquid or slurry host material.

Alternatively or in addition to recycle system 40, second vessel 21 may be configured to temporarily store at least a portion of dissociated host material.

The vehicle fuel system 100 may further comprise delivery system 50 configured to deliver gas dissociated from gas clathrates within first vessel 11 and second vessel 21 to the prime mover of a vehicle utilizing vehicle fuel system 100.

Delivery system 50 may comprise a gas storage vessel 51 configured to store dissociated gas removed from the second vessel 21. Second vessel 21 may comprise a gas outlet configured for removing dissociated at least one gas from the second vessel 21. The gas storage vessel 51 may be operably connected to the gas outlet of second vessel 21 and operably connected to the prime mover.

Delivery system 50 may further comprise a metering system 52 configured to control introduction of stored gas to the prime mover. Metering system 52 may comprise a control valve operably connected to the gas storage vessel 51 and to the prime mover. The control valve may be configured to control release of stored gas from the gas storage vessel 51. Metering system 52 may further comprise a gas flow meter configured to measure the flow rate of the stored gas released from the gas storage vessel 51.

Delivery system 50 may comprise a third transport device 59 configured to transport gas from the separation system to the prime mover of a vehicle. The third transport device may be configured to control the transport of the gas based on the fuel requirements of the prime mover. The third transport device 59 may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Third transport device 59 may increase the temperature of the gas transported thereby, such as when the gas is compressed. Accordingly, delivery system 50 may further comprise a cooling device 53 configured to reduce the temperature of dissociated at least one gas prior to introduction of the gas into the prime mover.

Cooling device 53 may comprise a heat exchanger configured to be cooled by ambient air, such as a heat exchanger comprising cooling fins. Cooling device 53 may comprise a heat exchanger configured to be cooled by a coolant also used to cool the prime mover. Cooling device 53 may comprise a heat exchanger configured to impart heat to the second vessel 21 to cool the heat exchanger. In such embodiments, cooling device 53 may be at least partially integrated into a surface, including an internal or external surface, of the second vessel 21. Cooling device 53 may comprise a heat exchanger configured to be cooled by dissociated host material. Cooling device 53 may comprise a heat exchanger configured to be cooled by gas clathrates either stored by first vessel 11 or being transported by first transport device 39. For example, the heat exchanger may be at least partially integrated with the first transport device 39. Cooling device 53 may comprise a refrigerated coil configured to cool the dissociated at least one gas.

Dissociated gas may comprise more water vapor than can be tolerated by the prime mover of a vehicle utilizing vehicle fuel system 100. Therefore, delivery system 50 may further comprise a moisture-removal system 54 configured to remove water from dissociated gas. Moisture-removal system 54 may comprise a dehumidifier, a dryer, and/or a molecular sieve column.

Moisture-removal system 54 may be integrated internally within the second vessel 21 or may be located external to the second vessel 21. Moisture-removal system 54 may be integrated into a portion of a surface, including an internal or external surface, of the second vessel 21.

Gas storage vessel 51, metering system 52, cooling device 53, moisture-removal system 54, and third transport device 59 of delivery system 50 may be combined in any order. Additionally, any or all of the components of delivery system 50 may not be present.

In some embodiments, a portion of the gas clathrates stored in first vessel 11 will dissociate within first vessel 11. Additionally, gas may be stored in first vessel 11 that never associated into clathrates with host material. In such embodiments, the first vessel 11 comprises a gas outlet configured and located for removing gas from the first vessel 11. The gas outlet of the first vessel 11 may be operably connected to gas storage vessel 51. Alternatively, the gas outlet of the first vessel 11 may be operably connected to the second vessel 21 and any gas present in first vessel 11 conveyed to second vessel 21.

In some embodiments, the first vessel 11 may be configured to be readily and easily removed from a vehicle and configured to be readily and easily reattached to a vehicle. In such embodiments, second vessel 21 may not be present, but instead the functionality of separation system 20 may be integrated with vehicle fuel storage system 10, such that the gas clathrates are dissociated within first vessel 11.

In some embodiments, the first vessel 11 may be configured to facilitate gas clathrate formation by agitating the gas and host material. First vessel 11 may be configured to agitate the gas and host material at a first temperature and a first pressure compatible with forming the gas clathrates. First vessel 11 may comprise a mixing element located within the first vessel 11 that is configured to agitate the gas and host material. First vessel 11 may further be configured to agitate formed gas clathrates at a second temperature and a second pressure compatible with dissociating the gas clathrates back into the gas and host material for delivery to the prime mover of a vehicle. In such embodiments, second vessel 21 may not be present, but instead the functionality of separation system 20 may be integrated with vehicle fuel storage system 10.

This disclosure also provides a vehicle comprising the vehicle fuel system 100 and a prime mover configured to utilize dissociated gas to generate power. The prime mover may comprise an internal combustion engine, an external combustion engine, or a fuel cell. In some embodiments, the exhaust stream of the prime mover is condensed to transfer heat energy to the second vessel 21.

This disclosure also provides a method of powering a vehicle, where the method comprises providing a vehicle fuel storage system comprising a first vessel configured to receive, store, and discharge gas clathrates. The method further comprises discharging a portion of the gas clathrates from the first vessel and then generating heat from combusting the discharged gas clathrates. The method further comprises converting the generated heat into mechanical work and utilizing the mechanical work to power the drive train of a vehicle. The combustion may be conducted in an engine configured to convert the generated heat from combustion into the mechanical work.

Figure 3:
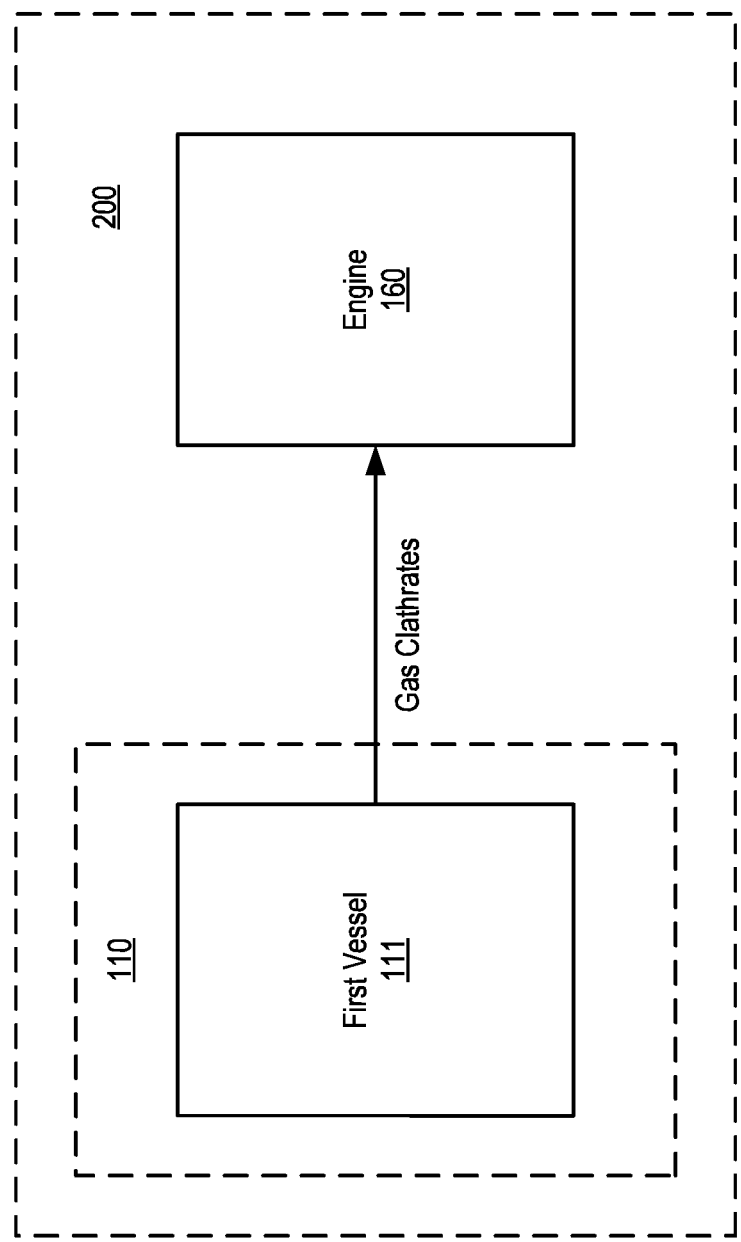
FIG. 3 illustrates an embodiment of a vehicle configured to utilize gas clathrates as fuel source.

This disclosure also provides a vehicle comprising an engine configured to directly utilize gas clathrates as a fuel source. FIG. 3 illustrates a vehicle 200 comprising a vehicle fuel storage system 110 comprising a first vessel 111 configured to receive, store, and discharge gas clathrates. Vehicle 200 further comprises an engine 160 configured to directly utilize gas clathrates as a fuel source.

Engine 160 may be configured to receive gas clathrates as a solid, such as in chunks, pellets, flakes, and/or pulverized particles, and/or as a slurry.

Engine 160 may comprise an internal or external combustion engine. Engine 160 may be configured to recover energy due to recondensation of vaporized clathrate host material. The energy may be recovered within an exhaust system of engine 160 or within a cylinder of engine 160. Engine 160 may be configured to supply at least a portion of the thermal energy recovered from the engine 160 to the first vessel 111.

Engine 160 may comprise a two-stroke engine. Engine 160 may comprise a four-stroke engine. For example, the four-stroke engine may comprise pistons configured for reciprocation or may comprises a pistonless rotary engine. The four-stroke engine may comprise an injector configured to spray liquified gas clathrates into a combustion chamber of the four-stroke engine. The gas clathrates may be liquified either before introduction to the injector or may be liquified within the injector. Engine 160 may also comprise a six-stroke engine.

Engine 160 may also comprise any of the engines discussed below regarding FIGS. 4-8.

Figure 4:
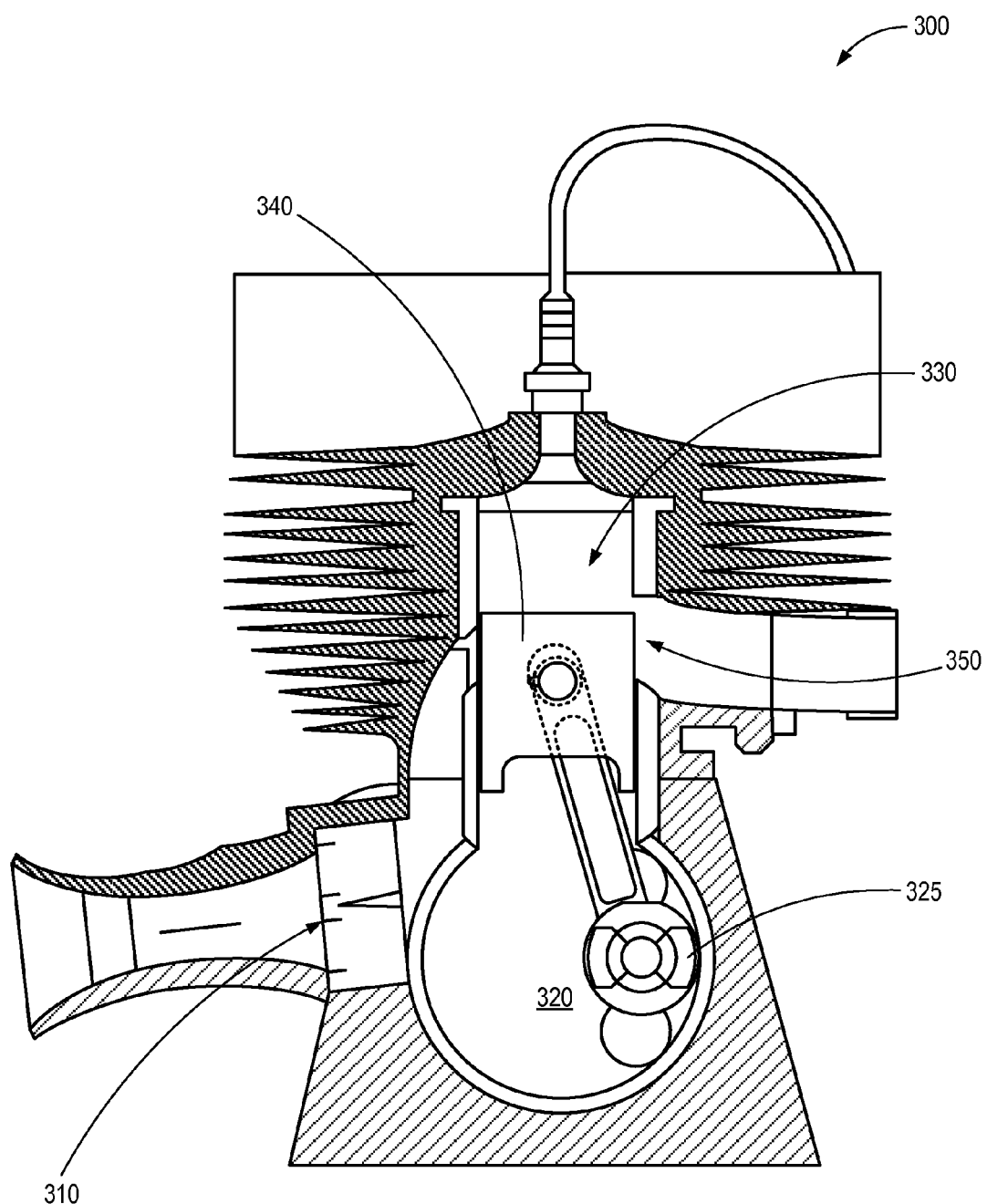
FIG. 4 illustrates an embodiment of an engine configured to directly utilize gas clathrates as a fuel source.

FIG. 4 illustrates an engine 300 configured to directly utilize gas clathrates as a fuel source. Engine 300 is a two-stroke engine. Engine 300 comprises an intake port 310 configured to receive gas clathrates. Engine 300 further comprises a crankcase 320 in fluidic communication with the intake port 310. Crankcase 320 is operably sized and configured to receive the gas clathrates in sequence with rotation of a crankshaft 325 rotatably engaged within the crankcase 320. Crankcase 320 is configured to dissociate the gas clathrates into at least one gas and host material within crankcase 320. Engine 300 further comprises a combustion chamber 330 in fluidic communication with the crankcase 320 and configured to combust the at least one gas dissociated within crankcase 320. Engine 300 further comprises a piston 340 slidably engaged within the combustion chamber 330 and operably connected to the crankshaft 325. Engine 300 further comprises an exhaust port 350 operably connected to the combustion chamber 330 and configured to remove combustion products from the combustion chamber 330 in sequence with movement of the piston 340.

Crankcase 320 may be further configured to at least partially vaporize the host material, such that the vaporized host material is transported with the dissociated gas into the combustion chamber 330. Combustion chamber 33 and/or the exhaust port 350 may be configured to remove vaporized host material from the combustion chamber 330, including any host material that may have recondensed within combustion chamber 330.

Engine 300 may be configured to transfer at least a portion of heat energy from the exhaust stream of the engine 300 to the crankcase 320. For example, engine 300 may comprise a heat exchanger operably connected with the exhaust port 350 and operably connected with at least a portion of a surface, such as an external surface, of the crankcase 320. The heat exchanger may be configured to transfer at least a portion of the heat energy from the exhaust stream to the surface of the crankcase 320.

The intake port 310 may also be configured to receive an oxygen supply in addition to receiving gas clathrates. The oxygen supply may comprise air and/or pure oxygen. Alternatively, or in addition thereto, engine 300 may further comprise a second intake port configured to receive the oxygen supply, but not the gas clathrates. The second intake port may be configured for fluidic communication with the crankcase 320.

Engine 300 may further comprise an oil reservoir and oil pump located external to the crankcase 320 and configured to provide lubricating oil to moving parts within the crankcase 320 and the combustion chamber 330. Engine 300 may be configured to combust the lubricating oil.

Any variation of a two-stroke engine that is known in the art and is compatible with direct utilization of gas clathrates as fuel may be used. For example, intake port 310 may be configured and located for piston control of engine 300. In another example, engine 300 may further comprise a reed inlet valve configured for fluidic communication with the intake port 310. For example, engine 300 may comprise a bourke engine. In other examples, engine 300 may be configured for cross-flow scavenging, loop scavenging, or uni-flow scavenging. Engine 300 may further comprise an exhaust port timing valve in fluidic communication with the exhaust port 350. Engine 300 may further comprise a valve in fluidic communication with the exhaust port 350, where the valve is configured to alter the volume of combustion products removed via the exhaust port 350.

The combustion chamber 330 may comprise a cylinder configured for operable connection with the piston 330, wherein the piston 330 is located within the cylinder. Engine 300 may be configured to transfer at least a portion of the heat energy from the cylinder to the crankcase 320.

Figure 5:
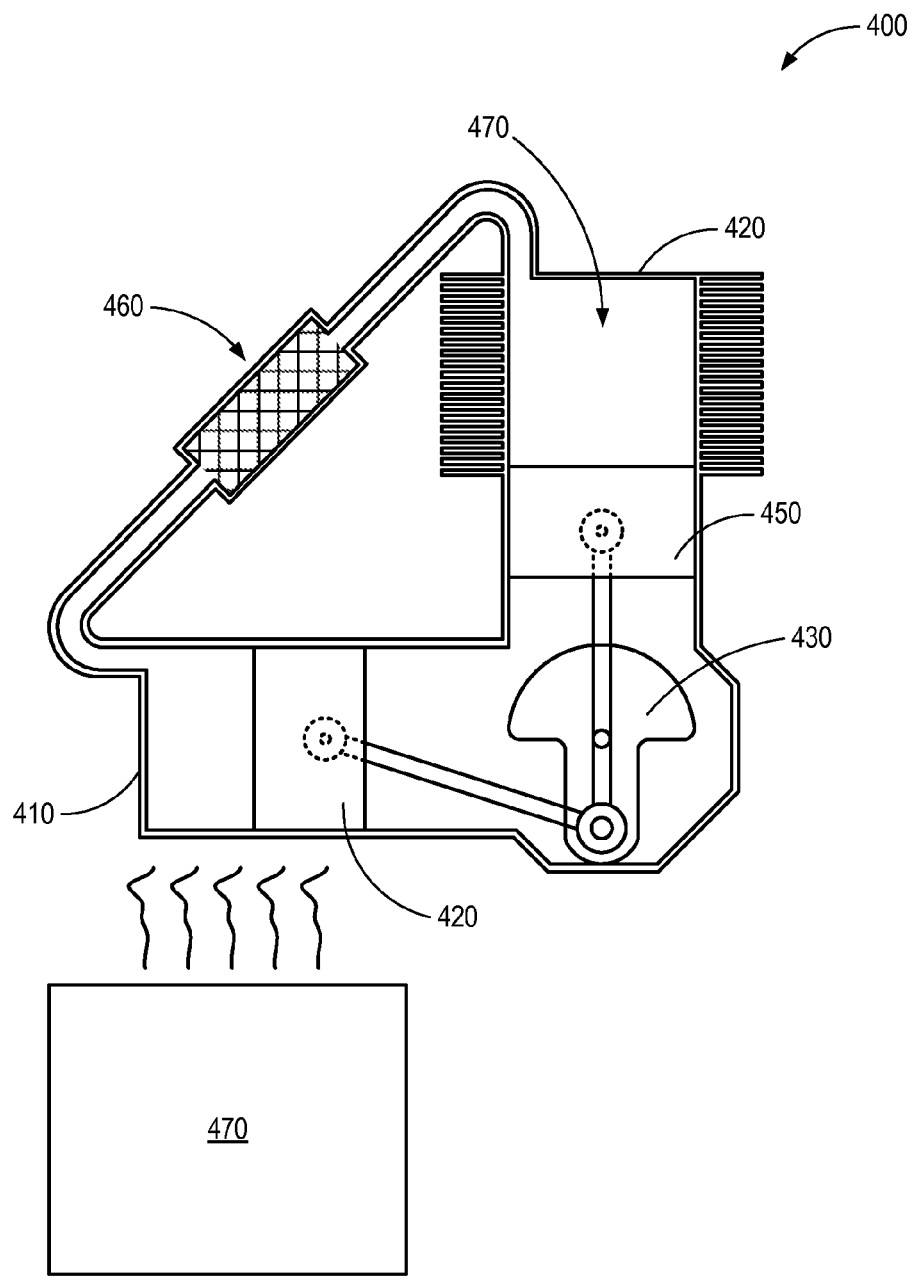
FIG. 5 illustrates another embodiment of an engine configured to directly utilize gas clathrates as a fuel source.

FIG. 5 illustrates an engine 400 configured to directly utilize gas clathrates as a fuel source. Engine 400 is an alpha configuration stirling engine. Engine 400 comprises a hot cylinder 410 and a first piston 420 slidably engaged within the hot cylinder 410. Engine 400 further comprises a flywheel 430 operably connected to the first piston 420. Engine 400 further comprises a cool cylinder 440 and a second piston 450 slidably engaged within the cool cylinder 440. The second piston 450 is operably connected to the flywheel 430. Engine 400 further comprises a regenerator 460 configured to fluidically connect a working fluid within the hot cylinder 410 and the cool cylinder 440 and configured to transfer heat to and from the working fluid as the fluids is shuttled back and forth between hot cylinder 410 and cool cylinder 440. Engine 400 further comprises a combustion chamber 470 configured to combust the gas clathrates and supply heat to the hot cylinder 410.

Combustion chamber 470 may be operably connected to a vehicle fuel storage system, such as vehicle fuel storage system 110 of FIG. 3.

Any variation of an alpha configuration stirling engine that is known in the art and is compatible with direct utilization of gas clathrates as fuel may be used. For example, cool cylinder 440 may be configured with cooling fins designed to radiate heat away from the cool cylinder 440 and/or cool cylinder 440 may be configured for liquid cooling. In another example, at least a portion of the hot cylinder 410 may be located within the combustion chamber 470. In yet another example, engine 400 may be configured to utilize heat energy from the exhaust stream from the combustion chamber 470 to heat at least a portion of the hot cylinder 410. Likewise, any working fluid known in the art for a stirling engine may be used, such as, by way on non-limiting example, air, hydrogen, helium, and/or nitrogen.

Engine 400 may be configured to further utilize heat energy from the exhaust stream from the combustion chamber 470 to impart heat to the gas clathrate storage vessel, such as the first vessel 111 of FIG. 3.

Combustion chamber 470 may be configured to substantially vaporize any host material dissociated from the gas clathrates. Combustion chamber 470, or some other components of engine 400, may be configured to substantially recondense any vaporized host material dissociated from the gas clathrates. Combustion chamber 470 may be configured to melt, but not vaporize, at least a portion of the host material.

Combustion chamber 470 may be configured to utilize pulverized gas clathrate solids blown into the combustion chamber 470. Combustion chamber 470 may be configured to utilize solid gas clathrate chunks, pellets, and/or flakes. Combustion chamber 470 may be configured to utilize gas clathrates as a slurry.

Combustion chamber 470 may comprises a grate configured to hold the gas clathrates during combustion of dissociated gas. The grate may be configured to allow liquid host material to drip through the grate. The liquid host material may collect below the grate. The grate may be configured to be stationary. Alternatively, the grate may be configured to rotate at least partially within the combustion chamber 470. Combustion chamber 470 may be operably connected to a stoker configured to feed gas clathrate solids onto at least a portion of the grate.

Combustion chamber 470 may comprise an outlet configured to remove collected host material from the combustion chamber 470. Engine 400 may further comprise a drain system fluidically connected to the outlet. The drain system may be configured to release the collected host material to the environment. Alternatively, the drain system may be fluidically connected to a host material storage tank configured to store the collected host material. Engine 400 may further comprise a cooling system fluidically connected to the outlet and configured to use the collected host material to cool the cool cylinder 440.

Engine 400 may further comprise an oxygen supply device operably connected to the combustion chamber 470 and configured to supply oxygen to the combustion chamber 470. The oxygen supply device may be configured to supply air to the combustion chamber 470, such as by blowing atmospheric air into the combustion chamber 470. Alternatively or in addition thereto, the oxygen supply device may comprise an oxygen tank and may be configured to provide pressurized oxygen to the combustion chamber 470.

Figure 6:
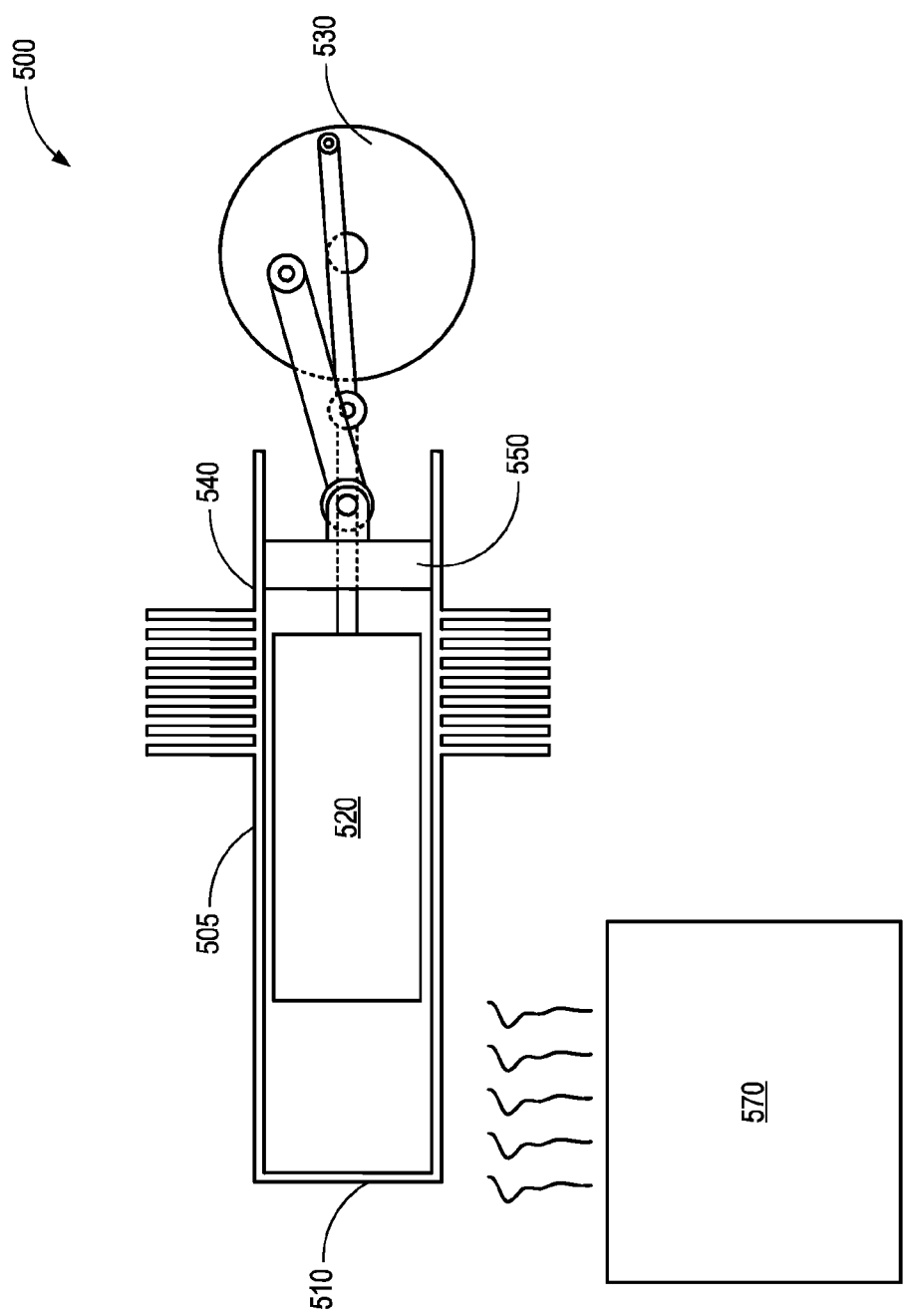
FIG. 6 illustrates another embodiment of an engine configured to directly utilize gas clathrates as a fuel source.

FIG. 6 illustrates an engine 500 configured to directly utilize gas clathrates as a fuel source. Engine 500 is a beta configuration stirling engine. Engine 500 comprises a cylinder 505 comprising a hot end 510 configured to transfer heat during operation to a working fluid within the cylinder 505 and comprising a cool end 540 configured to remove heat from the working fluid. Engine 500 further comprises a displacer piston 520 slidably engaged within the cylinder 505 and configured to move the working fluid back and forth between the hot end 510 and the cold end 540 during operation. The displacer piston 520 is operably connected to a flywheel 530. Engine 500 further comprises a working piston 550 slidably engaged within the cylinder 505 and operably connected to the flywheel 530. Engine 500 further comprises a combustion chamber 570 configured to combust the gas clathrates and supply heat to the hot end 510.

Combustion chamber 570 may be operably connected to a vehicle fuel storage system, such as vehicle fuel storage system 110 of FIG. 3.

Any variation of a beta configuration stirling engine that is known in the art and is compatible with direct utilization of gas clathrates as fuel may be used. For example, engine 500 may comprise a regenerator fluidically connected to the hot end 510 and to the cool end 540 of the cylinder 505. The regenerator may be configured to transfer heat to and from the working fluid within the cylinder 505. In another example, cool end 540 may be configured with cooling fins designed to radiate heat away from the cool end 540 and/or cool cylinder 540 may be configured for liquid cooling. In another example, at least a portion of the hot end 510 may be located within the combustion chamber 570. In yet another example, engine 500 may be configured to utilize heat energy from the exhaust stream from the combustion chamber 570 to heat at least a portion of the hot end 510. Likewise, any working fluid known in the art for a stirling engine may be used, such as, by way on non-limiting example, air, hydrogen, helium, and/or nitrogen.

Engine 500 may be configured to further utilize heat energy from the exhaust stream from the combustion chamber 570 to impart heat to the gas clathrate storage vessel, such as the first vessel 111 of FIG. 3.

Combustion chamber 570 may be configured to substantially vaporize any host material dissociated from the gas clathrates. Combustion chamber 570, or some other components of engine 500, may be configured to substantially recondense any vaporized host material dissociated from the gas clathrates. Combustion chamber 570 may be configured to melt, but not vaporize, at least a portion of the host material.

Combustion chamber 570 may be configured to utilize pulverized gas clathrate solids blown into the combustion chamber 570. Combustion chamber 570 may be configured to utilize solid gas clathrate chunks, pellets, and/or flakes. Combustion chamber 570 may be configured to utilize gas clathrates as a slurry.

Combustion chamber 570 may comprises a grate configured to hold the gas clathrates during combustion of dissociated gas. The grate may be configured to allow liquid host material to drip through the grate. The liquid host material may collect below the grate. The grate may be configured to be stationary. Alternatively, the grate may be configured to rotate at least partially within the combustion chamber 570. Combustion chamber 570 may be operably connected to a stoker configured to feed gas clathrate solids onto at least a portion of the grate.

Combustion chamber 570 may comprise an outlet configured to remove collected host material from the combustion chamber 570. Engine 500 may further comprise a drain system fluidically connected to the outlet. The drain system may be configured to release the collected host material to the environment. Alternatively, the drain system may be fluidically connected to a host material storage tank configured to store the collected host material. Engine 500 may further comprise a cooling system fluidically connected to the outlet and configured to use the collected host material to cool the cool end 540.

Engine 500 may further comprise an oxygen supply device operably connected to the combustion chamber 570 and configured to supply oxygen to the combustion chamber 570. The oxygen supply device may be configured to supply air to the combustion chamber 570, such as by blowing atmospheric air into the combustion chamber 570. Alternatively or in addition thereto, the oxygen supply device may comprise an oxygen tank and may be configured to provide pressurized oxygen to the combustion chamber 570.

Figure 7:
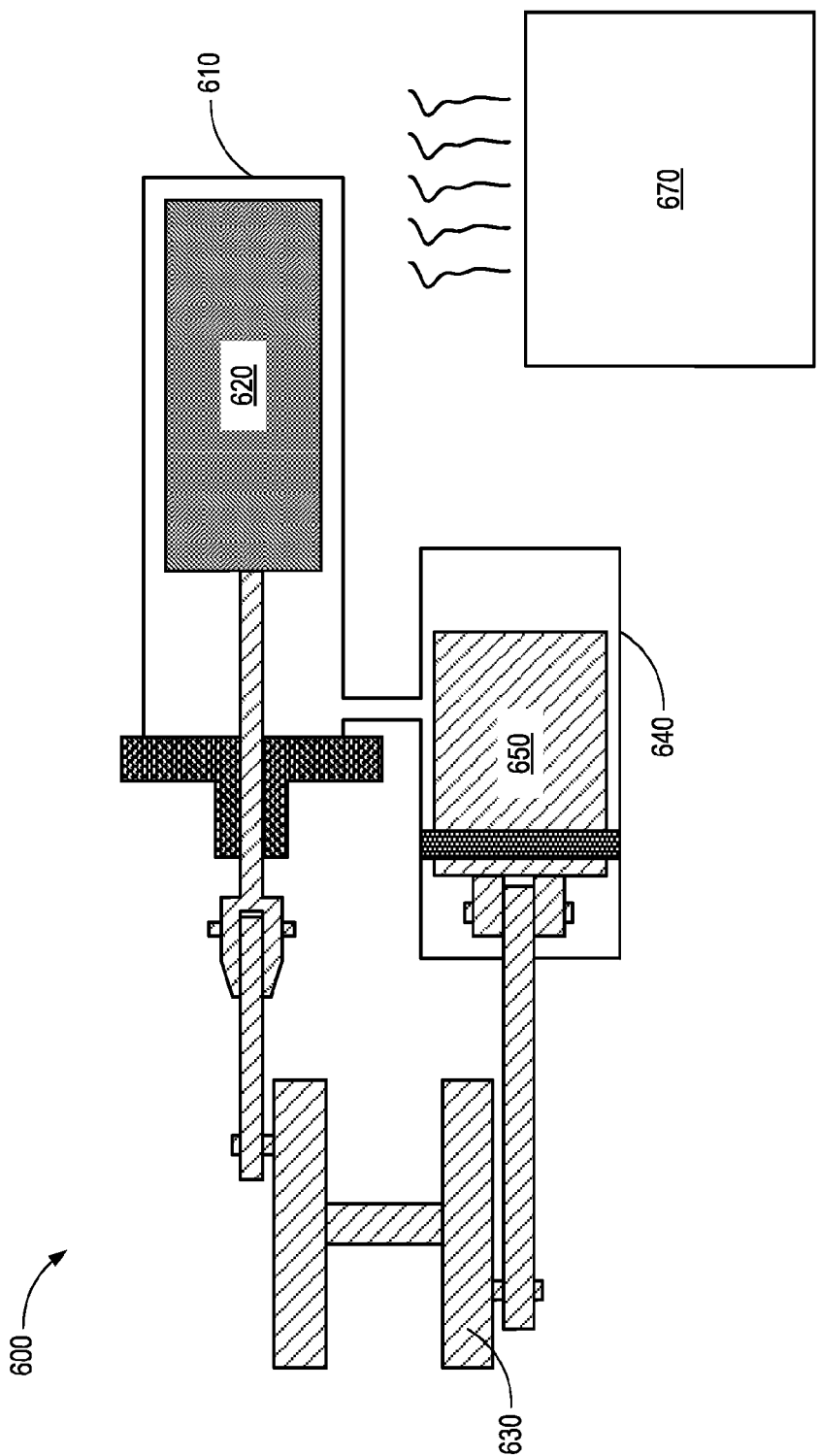
FIG. 7 illustrates another embodiment of an engine configured to directly utilize gas clathrates as a fuel source.

FIG. 7 illustrates an engine 600 configured to directly utilize gas clathrates as a fuel source. Engine 600 is a gamma configuration stirling engine. Engine 600 comprises a hot cylinder 610 and a displacer piston 620 slidably engaged within the hot cylinder 610. The displacer piston is operably connected to a flywheel 630. Engine 600 further comprises a cool cylinder 640 and a second piston 650 slidably engaged within the cool cylinder 640. The second piston is operably connected to the flywheel 630. Engine 600 further comprises a combustion chamber 670 configured to combust the gas clathrates and supply heat to the hot cylinder 610.

Combustion chamber 670 may be operably connected to a vehicle fuel storage system, such as vehicle fuel storage system 110 of FIG. 3.

Any variation of a gamma configuration stirling engine that is known in the art and is compatible with direct utilization of gas clathrates as fuel may be used. For example, engine 600 may comprise a regenerator fluidically connected to the hot cylinder 610 and to the cool cylinder 640. The regenerator may be configured to transfer heat to and from the working fluid within hot cylinder 610 and cool cylinder 640. In another example, cool cylinder 640 may be configured with cooling fins designed to radiate heat away from the cool cylinder 640 and/or cool cylinder 640 may be configured for liquid cooling. In another example, at least a portion of the hot cylinder 610 may be located within the combustion chamber 670. In yet another example, engine 600 may be configured to utilize heat energy from the exhaust stream from the combustion chamber 670 to heat at least a portion of the hot cylinder 610. Likewise, any working fluid known in the art for a stirling engine may be used, such as, by way on non-limiting example, air, hydrogen, helium, and/or nitrogen.

Engine 600 may be configured to further utilize heat energy from the exhaust stream from the combustion chamber 670 to impart heat to the gas clathrate storage vessel, such as the first vessel 111 of FIG. 3.

Combustion chamber 670 may be configured to substantially vaporize any host material dissociated from the gas clathrates. Combustion chamber 670, or some other components of engine 600, may be configured to substantially recondense any vaporized host material dissociated from the gas clathrates. Combustion chamber 670 may be configured to melt, but not vaporize, at least a portion of the host material.

Combustion chamber 670 may be configured to utilize pulverized gas clathrate solids blown into the combustion chamber 670. Combustion chamber 670 may be configured to utilize solid gas clathrate chunks, pellets, and/or flakes. Combustion chamber 670 may be configured to utilize gas clathrates as a slurry.

Combustion chamber 670 may comprises a grate configured to hold the gas clathrates during combustion of dissociated gas. The grate may be configured to allow liquid host material to drip through the grate. The liquid host material may collect below the grate. The grate may be configured to be stationary. Alternatively, the grate may be configured to rotate at least partially within the combustion chamber 670. Combustion chamber 670 may be operably connected to a stoker configured to feed gas clathrate solids onto at least a portion of the grate.

Combustion chamber 670 may comprise an outlet configured to remove collected host material from the combustion chamber 670. Engine 600 may further comprise a drain system fluidically connected to the outlet. The drain system may be configured to release the collected host material to the environment. Alternatively, the drain system may be fluidically connected to a host material storage tank configured to store the collected host material. Engine 600 may further comprise a cooling system fluidically connected to the outlet and configured to use the collected host material to cool the cool cylinder 640.

Engine 600 may further comprise an oxygen supply device operably connected to the combustion chamber 670 and configured to supply oxygen to the combustion chamber 670. The oxygen supply device may be configured to supply air to the combustion chamber 670, such as by blowing atmospheric air into the combustion chamber 670. Alternatively or in addition thereto, the oxygen supply device may comprise an oxygen tank and may be configured to provide pressurized oxygen to the combustion chamber 670.

Figure 8:
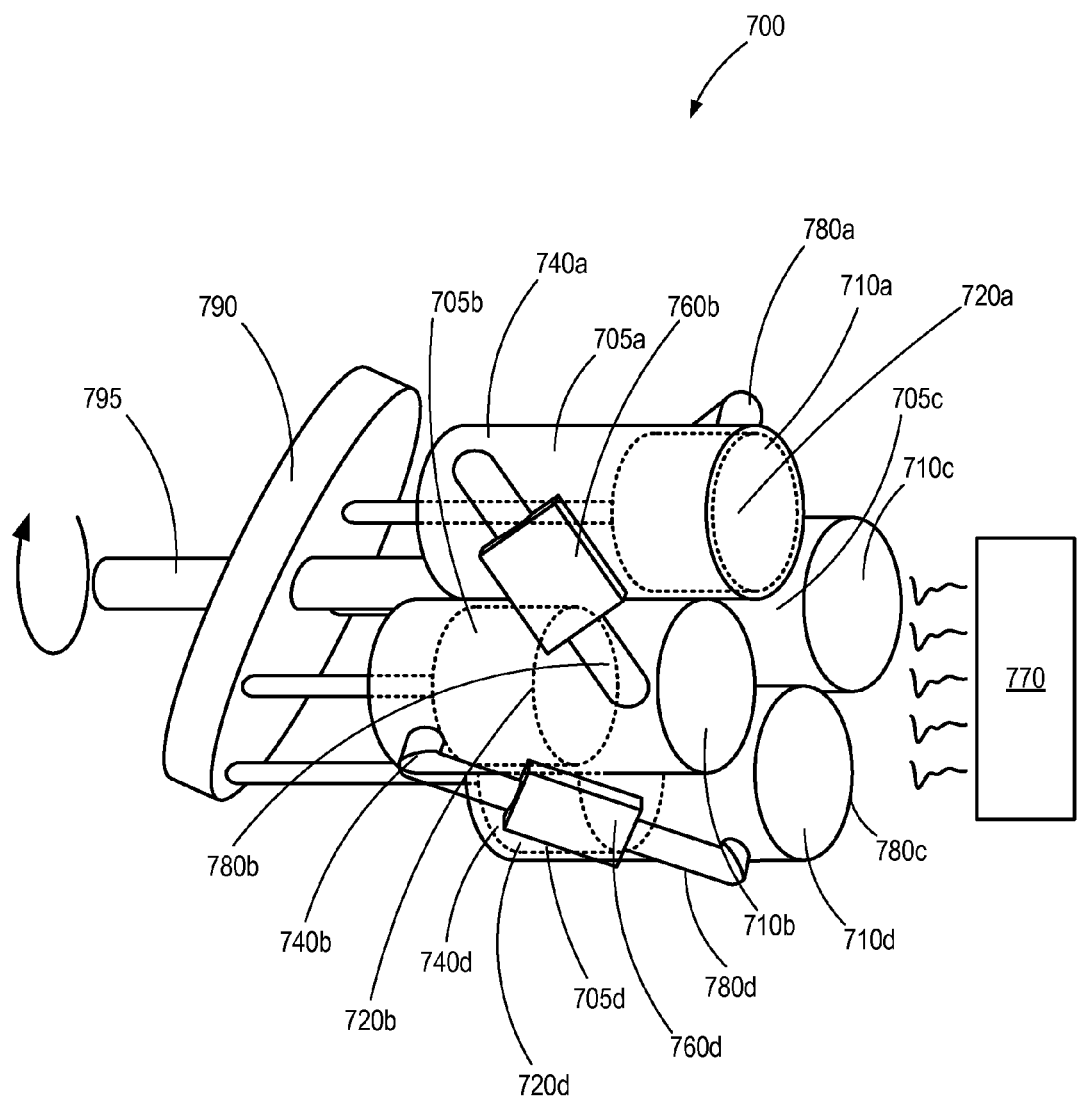
FIG. 8 illustrates another embodiment of an engine configured to directly utilize gas clathrates as a fuel source.

FIG. 8 illustrates an engine 700 configured to directly utilize gas clathrates as a fuel source. Engine 700 is a double-acting configuration stirling engine coupled to a swash plate to generate rotary motion. Engine 700 comprises, in the illustrated embodiment, four cylinders 705a, 705b, 705c, and 705d. Each of the cylinders comprises a hot end 710a, 710b, 710c, and 710d, respectively, configured to transfer heat during operation to a working fluid within each of cylinder. Each of the cylinders comprises a cool end 740a, 740b, 740c (not shown), and 740d, respectively, configured to remove heat from the working fluid.

Engine 700 further comprises multiple conduits 780a, 780b, 780c (not shown), and 780d, respectively. Each conduit fluidically connects one hot end of a cylinder with one cool end of a different cylinder. For example, conduit 780a connects hot end 710a with cool end 740c (not shown). Conduit 780b connects hot end 710b with cool end 740a. Conduit 780c connects hot end 710c with cool end 740d. Conduit 780d connects hot end 710d with cool end 740b. In this way, the working fluid within each cylinder is in fluidic communication with the working fluid within each of the other cylinders. Conduit 780a includes a regenerator (not shown). Conduit 780b includes a regenerator 760b. Conduit 780c includes a regenerator (not shown). Conduit 780d includes a regenerator 760d. Each of the regenerators is configured to transfer heat to and from the working fluid as it shuttles within the respective conduit.

Engine 700 further comprises multiple pistons. Each of cylinders 705a, 705b, 705c, and 705d house a piston 720a, 720b, 720c (not shown), and 720d, respectively, slidably engaged within each cylinder. Each of pistons 720a, 720b, 720c, and 720d is operably connected to a single swash plate 790. Reciprocating motion of pistons 720a, 720b, 720c, and 720d translates into rotary motion of the swash plate 790. Swash plate 790 is operably connected to rotatable shaft 795. Rotatable shaft 795 may in turn be connected to drive components of a vehicle, such as vehicle 200 of FIG. 3.

Engine 700 further comprises a combustion chamber 770 configured to combust the gas clathrates and supply heat to each of the hot ends 710a, 710b, 710c, and 710d.

Combustion chamber 770 may be operably connected to a vehicle fuel storage system, such as vehicle fuel storage system 110 of FIG. 3.

Any variation of a double-acting stirling engine that is known in the art and is compatible with direct utilization of gas clathrates as fuel may be used. For example, engine 700 may comprise more or less cylinders. In another example, each of cool ends 740a, 740b, 740c, and 740d may be configured with cooling fins designed to radiate heat away from itself and/or may be configured for liquid cooling. In another example, at least a portion of each of the hot ends 710a, 710b, 710c, and 710d may be located within the combustion chamber 770. In yet another example, engine 700 may be configured to utilize heat energy from the exhaust stream from the combustion chamber 770 to heat at least a portion of each of the hot ends 710a, 710b, 710c, and 710d. Likewise, any working fluid known in the art for a stirling engine may be used, such as, by way on non-limiting example, air, hydrogen, helium, and/or nitrogen.

Engine 700 may be configured to further utilize heat energy from the exhaust stream from the combustion chamber 770 to impart heat to the gas clathrate storage vessel, such as the first vessel 111 of FIG. 3.

Combustion chamber 770 may be configured to substantially vaporize any host material dissociated from the gas clathrates. Combustion chamber 770, or some other components of engine 700, may be configured to substantially recondense any vaporized host material dissociated from the gas clathrates. Combustion chamber 770 may be configured to melt, but not vaporize, at least a portion of the host material.

Combustion chamber 770 may be configured to utilize pulverized gas clathrate solids blown into the combustion chamber 770. Combustion chamber 770 may be configured to utilize solid gas clathrate chunks, pellets, and/or flakes. Combustion chamber 770 may be configured to utilize gas clathrates as a slurry.

Combustion chamber 770 may comprises a grate configured to hold the gas clathrates during combustion of dissociated gas. The grate may be configured to allow liquid host material to drip through the grate. The liquid host material may collect below the grate. The grate may be configured to be stationary. Alternatively, the grate may be configured to rotate at least partially within the combustion chamber 770. Combustion chamber 770 may be operably connected to a stoker configured to feed gas clathrate solids onto at least a portion of the grate.

Combustion chamber 770 may comprise an outlet configured to remove collected host material from the combustion chamber 770. Engine 700 may further comprise a drain system fluidically connected to the outlet. The drain system may be configured to release the collected host material to the environment. Alternatively, the drain system may be fluidically connected to a host material storage tank configured to store the collected host material. Engine 700 may further comprise a cooling system fluidically connected to the outlet and configured to use the collected host material to cool each of the cool ends 740a, 740b, 740c, and 740d.

Engine 700 may further comprise an oxygen supply device operably connected to the combustion chamber 770 and configured to supply oxygen to the combustion chamber 770. The oxygen supply device may be configured to supply air to the combustion chamber 770, such as by blowing atmospheric air into the combustion chamber 770. Alternatively or in addition thereto, the oxygen supply device may comprise an oxygen tank and may be configured to provide pressurized oxygen to the combustion chamber 770.

Returning to FIG. 3, engine 160 may also comprise a steam engine. The steam engine may comprise a boiler operably connected to a combustion chamber. The combustion chamber may be operably connected to the vehicle fuel storage system 110. The combustion chamber may be configured to combust the gas clathrates and also configured to supply heat to the boiler.

The boiler may comprise any boiler compatible with automotive use. For example, the boiler may comprise a fire-tube boiler, a water-tube boiler, or a fluidized bed combustion boiler. At least a portion of the boiler may be located within the combustion chamber.

The steam engine may be configured to further utilize heat energy from the exhaust stream from the combustion chamber to impart heat to the first vessel 111.

The combustion chamber may be configured to substantially vaporize any host material dissociated from the gas clathrates. The combustion chamber, or some other components of the steam engine, may be configured to substantially recondense any vaporized host material dissociated from the gas clathrates. The combustion chamber may be configured to melt, but not vaporize, at least a portion of the host material.

The combustion chamber may be configured to utilize pulverized gas clathrate solids blown into the combustion chamber. The combustion chamber may be configured to utilize solid gas clathrate chunks, pellets, and/or flakes. The combustion chamber may be configured to utilize gas clathrates as a slurry.

The combustion chamber may comprise a grate configured to hold the gas clathrates during combustion of dissociated gas. The grate may be configured to allow liquid host material to drip through the grate. The liquid host material may collect below the grate. The grate may be configured to be stationary. Alternatively, the grate may be configured to rotate at least partially within the combustion chamber. The combustion chamber may be operably connected to a stoker configured to feed gas clathrate solids onto at least a portion of the grate.

The combustion chamber may comprise an outlet configured to remove collected host material from the combustion chamber. The steam engine may further comprise a drain system fluidically connected to the outlet. The drain system may be configured to release the collected host material to the environment. Alternatively, the drain system may be fluidically connected to a host material storage tank configured to store the collected host material.

The steam engine may further comprise an oxygen supply device operably connected to the combustion chamber and configured to supply oxygen to the combustion chamber. The oxygen supply device may be configured to supply air to the combustion chamber, such as by blowing atmospheric air into the combustion chamber. Alternatively or in addition thereto, the oxygen supply device may comprise an oxygen tank and may be configured to provide pressurized oxygen to the combustion chamber.

Turning now to vehicle fuel storage system 110, vehicle fuel storage system 110 may comprise analogous components and systems to that of vehicle fuel storage system 10. It should be understood that any disclosure regarding either system may be applicable to the other. It should be understood that any disclosure regarding first vessel 11 may also apply equally to the first vessel 111 and vice versa.

First vessel 111 may be configured to maintain a first temperature and a first pressure during storage of the gas clathrates. The first temperature and the first pressure may be compatible with maintaining stability of the gas clathrates, such as those temperatures and pressure discussed above regarding first vessel 11. The first vessel 111 may also be configured to maintain the first temperature and the first pressure during discharge of the gas clathrates from the first vessel.

Vehicle fuel storage system 110 may be configured to discharge the gas clathrates as a solid from the first vessel 111. The vehicle fuel storage system 110 may be configured to discharge from the first vessel 111 the gas clathrates as a slurry of solid gas clathrate particles within a carrier fluid. The carrier fluid may comprise melted host material. Vehicle 200 may further comprise a filtration device to at least partially prevent introduction of the carrier fluid into the engine 160. The filtration device may be configured to return at least a portion of the carrier fluid to the first vessel 111.

The vehicle fuel storage system 110 may comprise a metering system configured to control introduction of the gas clathrates to the engine 160. The metering system may be configured as necessary to handle the gas clathrates as either a solid or a slurry. The metering system may comprise a flow meter configured to measure the flow rate of the gas clathrates discharged from the first vessel 111. The metering system may also comprise a hopper configured to control the feed rate of the slurry to the engine 160.

The vehicle 200 may further comprise a first transport device operably connected to the vehicle fuel storage system 110 and operably connected to the metering system. The first transport device may be configured to transfer the gas clathrates from the vehicle fuel storage system 110 to the metering system. It should be understood that this first transport device is analogous to the first transport device 39 of vehicle fuel system 100. Any disclosure regarding the first transport device 39 and its interactions with the first vessel 11 and the second vessel 21 are applicable to this first transport device and its interactions with first vessel 111 and the metering system.

Vehicle 200 may also be configured such that a portion of the gas clathrates are dissociated into gas and host material and the gas delivered to engine 160. Thus, engine 160 may be configured to utilize both dissociated gas and gas clathrates as a fuel source. In some embodiments, vehicle 200 further comprises a separation system comprising a second vessel operably connected to the vehicle fuel storage system 110. This separation system may be configured to dissociate the gas clathrates into at least one gas and a host material. The separation system may be operably connected to a delivery system configured to deliver dissociated gas to engine 160. It should be understood that the separation system and delivery system are analogous to the separation system 20 and delivery system 50 of vehicle fuel system 100. Any disclosure regarding separation system 20 and delivery system 50 and their interactions with each other, vehicle fuel storage system 10, and with a prime mover are applicable to this separation system, delivery system, and their interactions with each other and with vehicle fuel storage system 110 and engine 160.

In such embodiments, the separation system may be configured to deliver dissociated gas to engine 160 and the vehicle fuel storage system 110 configured to deliver solid or slurry gas clathrates to engine 160. Alternatively, vehicle fuel storage system 110 may not deliver any of the gas clathrates to engine 160 and instead the separation system may also deliver solid or slurry gas clathrates to engine 160. For example, the separation system may comprise a second vessel that comprises a first outlet configured to discharge the dissociated at least one gas and a second outlet configured to discharge the solid or slurry gas clathrate. It should be understood that dissociated gas may also be present in the discharge from such a second outlet.

In addition to a separation system or as an alternative thereto, vehicle fuel storage system 110 may be configured to dissociate a portion of the gas clathrates into gas and host material. In such embodiments, vehicle fuel storage system 110 would be configured to both discharge dissociated gas and also gas clathrates as either a solid or slurry. For example, first vessel 111 may be configured to vary the temperature and the pressure of the first vessel 111 to a second temperature and a second pressure during discharge of the gas clathrates such that a portion of the gas clathrates are dissociated into at least one gas and a host material. For example, the second temperature may be about ambient temperature and/or at any temperature that is higher than the operating temperature for storage of the gas clathrates. Alternatively, the second temperature that is about the same as the operating temperature for storage of the gas clathrates, but the second pressure may be a lower pressure than that used for storage. The second temperature and second pressure may be such as those disclosed above regarding second vessel 21.

In such embodiments, vehicle fuel storage system 110 may be configured to deliver to the engine 160 the dissociated gas either separately from the discharged gas clathrates or may deliver the dissociated gas with the discharged gas clathrates. Additionally, dissociated gas may be discharged at the same time or at a different time as the solid or slurry gas clathrates are discharged. Similar to first vessel 11, first vessel 111 may comprise a gas outlet configured to discharge the dissociated at least one gas and a second outlet configured to discharge the solid or slurry gas clathrate. It should be understood that dissociated gas may also be present in the discharge from such a second outlet. Dissociated host material may serve as a carrier fluid for facilitating discharge of the solid gas clathrates as a slurry. Additionally or alternatively, vehicle fuel storage system 110 may comprise a drain configured to remove at least a portion of dissociated host material from first vessel 110.

In embodiments where dissociated gas is delivered to the engine 160 in addition to discharged gas clathrates, vehicle 200 may also comprise a delivery system configured to deliver gas dissociated from gas clathrates within first vessel 111 and/or the second vessel of a separation system to the engine 160. It should be understood that the delivery system may be analogous to the delivery system 50 of vehicle fuel system 100 and may be operably connected to vehicle fuel storage system 110 and/or the second vessel of a separation system. Any disclosure regarding delivery system 50 and its interactions with separation system 20 are applicable to this delivery system and its interactions with vehicle fuel storage system 110 and/or the separation system. The delivery system may be configured to introduce the discharged at least one gas into the engine 160 at substantially the same time as the discharged gas clathrates are introduced to the engine 160. The delivery system may be configured to alternately introduce the discharged at least one gas and the discharged gas clathrates into the engine 160.

In embodiments where dissociated gas is delivered to the engine 160 in addition to discharged gas clathrates, the engine 160 may comprises a first combustion chamber configured to receive and combust dissociated at least one gas. The engine 160 may further comprise a second combustion chamber configured to receive and combust discharged gas clathrate. The first combustion chamber may be thermally coupled to the second combustion chamber, whereby heat generated in the first combustion chamber is used to heat the second combustion chamber. Alternatively, the first combustion chamber may be thermally isolated from the second combustion chamber. In such embodiments, the engine 160 may comprise an internal combustion engine or an external combustion engine.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims.

The invention claimed is:

1. A vehicle fuel system comprising:
a vehicle fuel storage system comprising a first vessel configured to receive, store, and discharge fuel gas clathrates; and
a separation system comprising a second vessel operably connected to said vehicle fuel storage system, said separation system configured to dissociate said fuel gas clathrates into at least one fuel gas and a host material.

2. The vehicle fuel system of claim 1, wherein said first vessel is configured to maintain fuel gas clathrates as a slurry.

3. The vehicle fuel system of claim 1, wherein said first vessel is configured to maintain fuel gas clathrates as a solid.

4. The vehicle fuel system of claim 1, wherein said first vessel is configured to be integrally secured to a frame of a vehicle.

5. The vehicle fuel system of claim 1, wherein said first vessel is configured to be detachably secured to a frame of a vehicle.

6. The vehicle fuel system of claim 1, further comprising a first refrigeration system configured to maintain an internal temperature of said first vessel within a set range.

7. The vehicle fuel system of claim 6, wherein said set range comprises about 0° C. to about 25° C.

8. The vehicle fuel system of claim 1, wherein said first vessel is configured to receive said fuel gas clathrates as a solid.

9. The vehicle fuel system of claim 1, wherein said first vessel is configured to receive said fuel gas clathrates as a slurry.

10. The vehicle fuel system of claim 1, wherein said first vessel is configured to receive said fuel gas clathrates as at least one fuel gas and a host material and form said fuel gas clathrates within said first vessel.

11. The vehicle fuel system of claim 1, wherein said first vessel of said vehicle fuel storage system comprises a gas outlet configured and located for removing said at least one fuel gas from said first vessel.

12. The vehicle fuel system of claim 1, wherein said vehicle fuel storage system further comprises a first pressurizing device operably connected to said first vessel and configured to maintain pressure within said first vessel.

13. The vehicle fuel system of claim 1, wherein said vehicle fuel storage system further comprises a first heating system configured and located to impart heat energy to said first vessel.

14. The vehicle fuel system of claim 1, wherein said vehicle fuel storage system further comprises a cooling control system configured to monitor both pressure and temperature and to regulate at least one of pressure and temperature in order to maintain said fuel gas clathrate within a clathrate stability range.

15. The vehicle fuel system of claim 1, further comprising a first transport device operably connected to said vehicle fuel storage system and operably connected to said separation system, said first transport device configured to transfer said fuel gas clathrates from said vehicle fuel storage system to said separation system.

16. The vehicle fuel system of claim 15, wherein said first transport device is configured to transport said fuel gas clathrates as a slurry.

17. The vehicle fuel system of claim 15, wherein said first transport device is configured to transport said fuel gas clathrates as a solid.

18. The vehicle fuel system of claim 1, wherein said second vessel of said separation system is configured to operate at a temperature that is higher than an operating temperature of said first vessel.

19. The vehicle fuel system of claim 1, wherein said separation system further comprises a second refrigeration system configured to maintain an internal temperature of said second vessel within a set range.

20. The vehicle fuel system of claim 19, wherein said set range comprises about 0° C. to about 25° C.

21. The vehicle fuel system of claim 1, wherein said separation system further comprises a second heating system configured and located to impart heat energy to said second vessel.

22. The vehicle fuel system of claim 1, wherein said separation system is configured to maintain a pressure in said second vessel sufficient to dissociate at least some of said fuel gas clathrates into said at least one fuel gas and said host material and also maintain a pressure greater than the pressure required for delivering fuel to a prime mover utilizing said vehicle fuel system.

23. The vehicle fuel system of claim 1, wherein said separation system is configured to maintain an internal pressure in said second vessel of about ambient pressure to about 30 bar.

24. The vehicle fuel system of claim 1, wherein said separation system is configured to control the rate of dissociation of said fuel gas clathrates based on fuel requirements of a prime mover of a vehicle utilizing said vehicle fuel system.

25. The vehicle fuel system of claim 1, wherein said separation system is configured to control the rate of dissociation of said fuel gas clathrates by regulating at least one of the temperature and the pressure of said fuel gas clathrates within the second vessel.

26. The vehicle fuel system of claim 1, wherein said second vessel of said separation system comprises a host material outlet configured for removing said host material from said second vessel.

27. The vehicle fuel system of claim 1, wherein said separation system further comprises a second pressurizing device operably connected to said second vessel and configured to maintain pressure within said second vessel.

28. The vehicle fuel system of claim 1, further comprising a recycle system configured to return said host material to said vehicle fuel storage system from said separation system.

29. The vehicle fuel system of claim 28, wherein said recycle system comprises a second transport device configured to transport said host material from said second vessel to said first vessel.

30. The vehicle fuel system of claim 1, further comprising a gas storage vessel configured to store said dissociated at least one fuel gas removed from said second vessel, said gas storage vessel operably connected to said second vessel and operably connected to a prime mover of a vehicle.

31. The vehicle fuel system of claim 30, further comprising a control valve operably connected to said gas storage vessel and to said prime mover, wherein said control valve is configured to control release of stored at least one fuel gas from said gas storage vessel.

32. The vehicle fuel system of claim 30, further comprising a metering system configured to control introduction of stored at least one fuel gas to said prime mover.

33. The vehicle fuel system of claim 1, further comprising a third transport device configured to transport said at least one fuel gas from said separation system to a prime mover of a vehicle.

34. A vehicle comprising:
the vehicle fuel system of claim 1; and
a prime mover configured to receive and combust said at least one fuel gas.

35. The vehicle of claim 34, wherein said prime mover comprises an internal combustion engine.

36. The vehicle of claim 34, wherein said prime mover comprises an external combustion engine.

37. The vehicle of claim 34, wherein said prime mover comprises a fuel cell.

38. A method of providing gaseous fuel to a prime mover of a vehicle, said method comprising:
providing a vehicle fuel storage system comprising a first vessel configured to receive, store, and discharge fuel gas clathrates;
providing a separation system comprising a second vessel operably connected to said vehicle fuel storage system, said separation system configured to dissociate said fuel gas clathrates into at least one fuel gas and a host material;
discharging said fuel gas clathrates from said first vessel to said second vessel; and
dissociating at least a portion of said fuel gas clathrates into said at least one fuel gas and said host material.

39. The method of claim 38, wherein said first vessel is configured to discharge said fuel gas clathrates as a slurry to said second vessel.

40. A vehicle fuel storage system comprising a first vessel configured to receive, store, and discharge fuel gas clathrates, said first vessel configured to be readily and easily removed from a vehicle and configured to be readily and easily reattached to a vehicle.

41. A vehicle fuel storage system comprising a first vessel configured to receive at least one fuel gas and a host material, wherein said first vessel is configured to agitate said at least one fuel gas and said host material at a first temperature and a first pressure compatible with forming a fuel gas clathrates from said at least one fuel gas and said host material.

42. The vehicle fuel storage system of claim 41, wherein said first vessel comprises a mixing element located within said first vessel and is configured to agitate said at least one fuel gas and said host material.

43. The vehicle fuel storage system of claim 41, wherein said first vessel is further configured to agitate said gas clathrates at a second temperature and a second pressure compatible with dissociating said fuel gas clathrates into said at least one fuel gas and said host material.

* * * * *